United States Patent [19]
Kozuki et al.

[11] 4,086,584
[45] Apr. 25, 1978

[54] EXPOSURE RANGE CHANGEOVER CIRCUIT FOR MOTOR DRIVEN PHOTOGRAPHIC CAMERA

[75] Inventors: Susumu Kozuki, Yokohama; Toshikazu Ichiyanagi, Tokyo; Yoshiaki Watanabe, Fujisawa; Takashi Uchiyama, Yokohama; Akio Sunouchi, Tokyo, all of Japan

[73] Assignee: Canon Kabushiki Kaisha, Tokyo, Japan

[21] Appl. No.: 712,798

[22] Filed: Aug. 9, 1976

[30] Foreign Application Priority Data
Aug. 9, 1975 Japan .................................. 50/96910

[51] Int. Cl.² ............................ G03B 7/08; G03B 1/18
[52] U.S. Cl. .................................... 354/38; 354/60 R; 354/173

[58] Field of Search ............... 354/38, 60 R, 170, 171, 354/172, 173

[56] References Cited
U.S. PATENT DOCUMENTS

| 3,946,409 | 3/1976 | Toyoda ............................. 354/173 |
| 4,015,198 | 3/1977 | Iwashita et al. ...................... 354/173 |
| 4,021,826 | 5/1977 | Iwata et al. ............................ 354/173 |

Primary Examiner—Russell E. Adams
Attorney, Agent, or Firm—Toren, McGeady and Stanger

[57] ABSTRACT

A camera equipped with a shutter preselection automatic exposure range and a diaphragm preselection automatic exposure range is automatically switched to the shutter preselection mode when the camera is assembled with a motor drive unit which is set in RUN position, whereby it is insured that a series of successive frame exposures can be made at a predetermined frame frequency.

20 Claims, 9 Drawing Figures

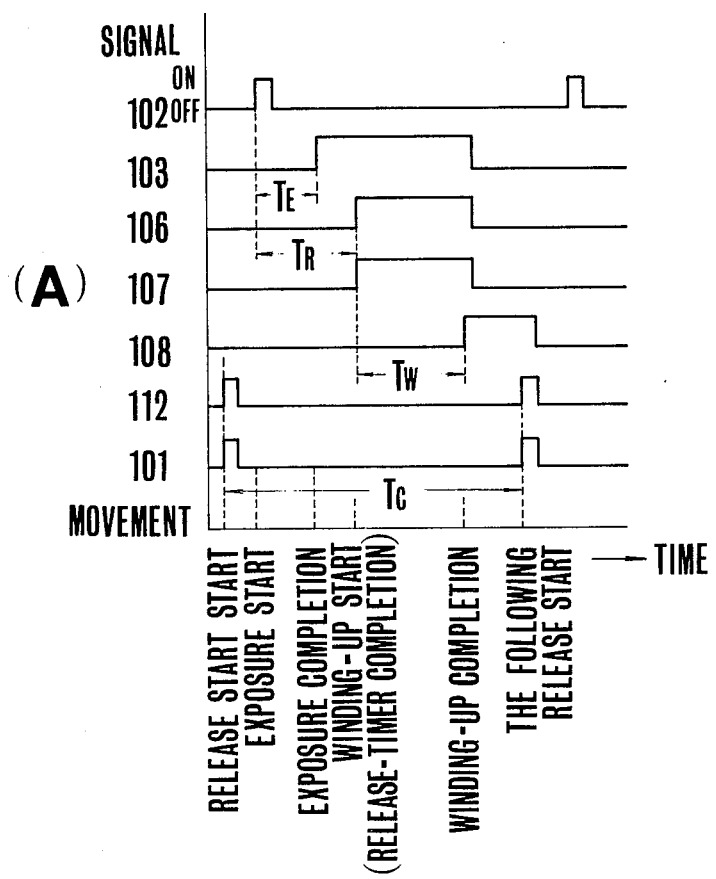

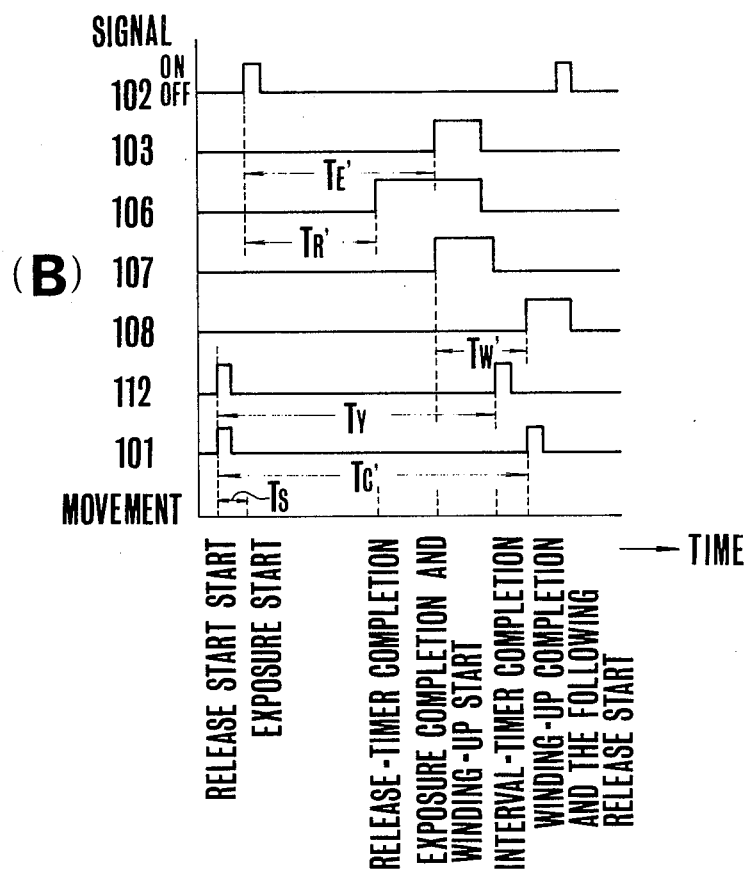

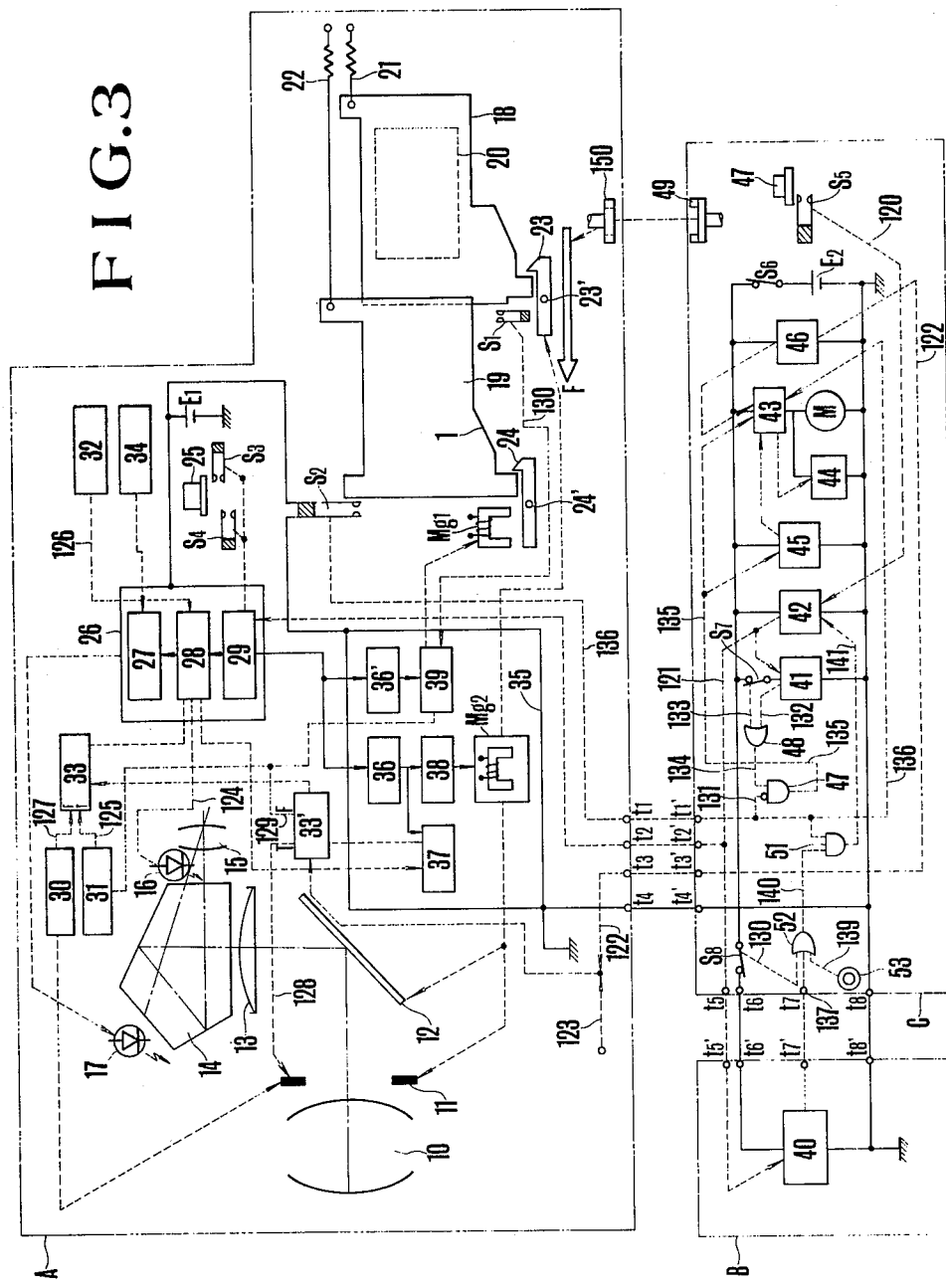

EXPOSURE RANGE CHANGEOVER CIRCUIT FOR MOTOR DRIVEN PHOTOGRAPHIC CAMERA

BACKGROUND OF THE INVENTION

1. Field of the Invention

This invention relates to photographic cameras having two range type automatic exposure control usuable with a motor drive unit, and more particularly to a system for selectively operating either of the shutter preselection automatic exposure control range and the diaphragm preselection automatic exposure control range with respect to the mode of operation of the motor drive unit.

2. Description of the Prior Art

Recently developed multi-purpose single lens reflex cameras are provided with a wide variaty of automatic exposure control modes with the so-called TTL type metering aspect. Some of these cameras are provided with a shutter preselection automatic exposure range alone wherein an effective diaphragm aperture value is determined based on the preselected shutter speed, and some with a diaphragm preselection automatic exposure range along wherein an effective exposure time is determined based on the preselected diaphragm value. Which of these ranges is preferred to select is dependent upon the given photographic situation. As far as such TTL-AE type of camera is concerned, therefore, it is ideal to operate these two exposure control ranges in a selective manner by simple manipulation. In this connection, various systems have been proposed for selectively controlling the operation of a camera having two range type automatic exposure control with the TTL-type metering aspect. Most recently important technological advances are directed to the use of a motor drive unit in combination with the TTL-AE camera having two operating ranges, as such motor driven camera has found an increasing demand particularly from newspaper photographers and expert armature photographers.

In application to continuous photography, it is suited to select a camera having the shutter preselection automatic exposure control range alone for use with the motor drive unit because shooting control is of primary importance. The prior art is, however, to provide some of the dual operating range AE type cameras as adapted to be usuable with a motor drive unit regardless of the fact that, in the diaphragm preselection automatic exposure range, the frame frequency is affected by the level of brightness of a scene being photographed.

In controlling the operation of this dual type camera associated with a motor drive unit which is set in RUN position to make a series of successive frame exposures, the termination of a first frame exposure is instantaneously followed by the initiation of film winding operation of which the termination is then followed by the next shutter release for making a second frame exposure. In this case, the time period necessary to complete one cycle of exposure operation is equal to the sum of the exposure time and the time interval during which the film winding mechanism is operated to advance film through the length of one frame. The frame frequency is defined as the reciprocal number of this time period in second. Now assuming that the film winding-up time period can be maintained constant from frame to frame, as each of the successive frame exposures is made with a once preselected shutter speed, the frame frequency in the shutter preselection automatic exposure range is unsusceptible to the variation of the scene brightness level. In the diaphragm preselection automatic exposure range, however, the actual exposure time is varied from frame to frame as the scene brightness level is varied. To avoid this, it is known to provide a frame frequency selector as incorporated in the motor drive unit and arranged to cooperate with the exposure control apparatus of the camera in such a manner as to establish an AND gate output. If a low frame frequency is selected, it is possible to make almost constant the frame frequency even in the diaphragm preselection mode, but significant numbers of photographic sistuations are encountered wherein such low frame frquency is unsuitable for recording purposes.

Since the subject to be taken with motor driven photographic cameras are usually in motion and the camera-to-subject distance changes permanently while shooting, the shutter preselection automatic exposure range is suitable which permits selection of relatively fast shutter speeds, though it is impossible to take into account so freely the depth of field of the subject as in the diaphragm preselection automatic exposure range.

The conventional cameras of the dual exposure range type adapted to be usuable with the motor drive unit are generally characterized by the lack of the provision for preventing accidental setting of the camera in the diaphragm preselection mode when the motor drive unit is used to cooperate with the camera, thus giving a disadvantage of making a series of successive frame exposures at ever-varying frame frequencies to limit the percentage of resultant photographs which will be found acceptable.

SUMMARY OF THE INVENTION

An object of the present invention is to provide a system for switching a camera of the dual exposure range type described to the shutter preselection automatic exposure range in automatic response to the attachment of a motor drive unit to said camera.

Another object is to provide a system for switching a camera of the type described to the shutter preselection automatic exposure range in automatic response to the attachment of a motor drive unit to said camera only when said motor drive unit is previously set in RUN position.

Still another object is to provide a system for switching a camera of the dual type described to the shutter preselection automatic exposure range in response to the setting of a motor drive unit from SINGLE FRAME position to RUN position as said camera is associated with said motor drive unit.

These and other objects of the invention will become apparent from the following detailed description taken in conjunction with the accompanying drawings in which:

BRIEF DESCRIPTION OF THE DRAWINGS

FIGS. 2A and 2B are signal timing charts illustrating the manners in which the camera may operate with the motor drive unit for the shutter preselection and the diaphragm preselection automatic exposure ranges respectively.

FIG. 3 is a block diagram of a flow chart of a switching system established in the association of a camera of the dual type described with a motor drive unit according to the principles of the present invention.

DESCRIPTION OF THE PREFERRED EMBODIMENTS

Figure 1:
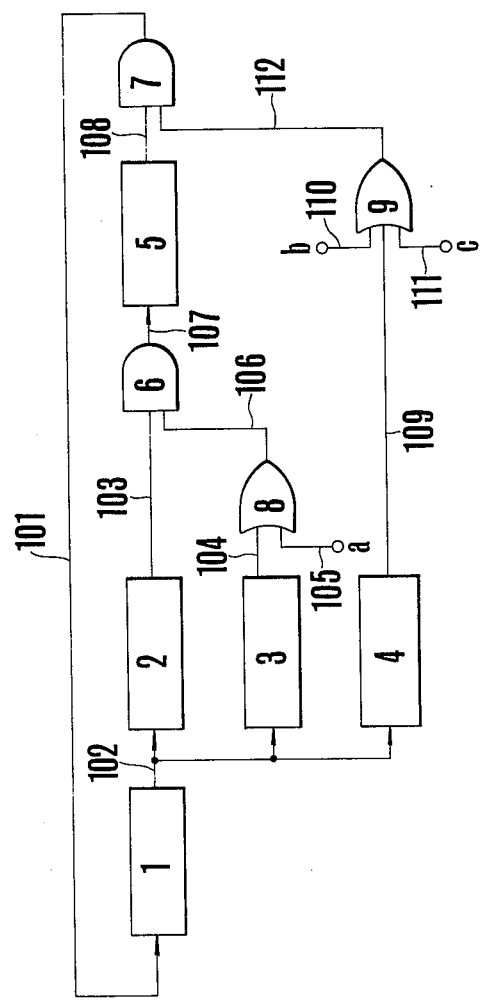
FIG. 1 is a block diagram of a signal flow chart illustrating the drive control of a photographic camera for continuous exposure operation by a motor drive unit.

Referring to FIG. 1, there is shown an example of the system for driving a photographic camera for continuous exposure operation by a motor drive unit. When a shutter button not shown provided either on the camera housing or on the unit housing is depressed to make a series of successive frame exposures, shutter release means 1 produces a signal 102 which is applied to each of shutter time control means 2, ONE-SHOT control means 3 and frame frequency control means 4. At the termination of duration of the exposure time, the shutter time control means 2 produces a signal 103 which is applied to a first input terminal of an AND gate 6, a second input terminal of which is supplied with a signal 106 from an OR gate 8 when the ONE-SHOT control means 3 having an output terminal connected to an input terminal of the OR gate 8 has counted a present time interval to produce an output signal 104. When the simultaneous occurrence of signals 103 and 106 is effected at the first and second inputs of AND gate 6 respectively, shutter-cocking and film winding means 5 is actuated by the output signal 107 of AND gate 6 to reset the shutter mechanism and to wind up the film as advanced through the length of one frame. When the operation of the shutter-cocking and film winding means 5 has been completed, a signal 108 is applied from means 5 to a first input terminal of a second AND gate 7. On the other hand, when the frame frequency control means 4 has counted a time interval corresponding to the preset frame frequency, an output signal 109 after converted to a signal 112 by an OR gate 9 is applied from means 4 to a second input terminal of AND gate 7. When the signals 108 and 112 simultaneously appear at the respective input terminals of AND gate 7, a release actuating signal 101 is applied to the shutter release means 1. Such procedure repeats itself until the final frame exposure has been completed. If a signal 105 is applied to an input terminal (a) of OR gate 8, ONE-SHOT control means 3 is cut off from AND gate 6, and if a signal 110 is applied to an input terminal (b) of OR gate 9, the frame frequency control means 4 is cut off from AND gate 7 so that AND gate 7 can be acted on by application of a trigger signal 111 from the outside of the system to an input terminal (c) of OR gate 9, whereby the system of FIG. 1 is rendered operative for single frame exposure.

FIG. 2 is a voltage-versus-time chart showing the duration and the time-displaced relation of the various signals of FIG. 1 to each other and with respect to the initiation and termination of operation of the means 1, 2 and 5 of FIG. 1. FIG. 2A shows the manner in which the system of FIG. 1 may operate to result in the exact coincidence of the actual frame frequency with the preselected one, as the exposure time $T_E$ is shorter than the time interval $T_R$ set in the ONE-SHOT control means 3 and the sum of the time interval $T_R$ and the time interval $T_W$ necessary to effect the film winding operation is shorter than the reciprocal number $T_C$ of the preselected frame frequency at means 4. In the case of FIG. 2B manner, the exposure time $T_E'$ as resulted from the diaphragm preselection automatic exposure range is longer than the time interval $T_R'$, so that the film winding operation is initiated in synchronism with the termination of the exposure. Further the sum of the exposure time $T_E'$ and the winding time interval $T_W'$ is longer than the reciprocal number $T_C$, resulting in variation of the actual frame frequency.

Another serious drawback is that, because of no simultaneous occurrence of signals 108 and 112 at the respective inputs of AND gate 7, the next frame exposure cannot be made.

The principles of the present invention are depicted in FIG. 3 as embodied in a system for switching a photographic camera, in this instance, a single lens reflex camera of the dual type from the diaphragm preselection automatic exposure range to the shutter preselection automatic exposure range in automatic response either to the attachment of a motor drive unit to the camera, or to the setting of the motor drive unit from SINGLE FRAME position to RUN position as the camera is associated with the drive unit.

The camera enclosed by dot-and-dash lines A includes an objective lens 10, a diaphragm 11, a tiltable reflex mirror 12, a condenser lens 13, a penta prism 14 and an eye-piece 15. Positioned behind the exit face of penta prism 14 is a photosensitive element 16 to receive a portion of the light entering through the lens 10, the aperture of diaphragm 11 and the viewfinder 12 to 14. The camera further includes a shutter mechanism comprising a front shutter curtain 18, a rear shutter curtain 18, the curtains 18 and 19 being arranged to be movable in front of a film gate 20 under the action of springs 21 and 22 respectively when released from their respective latching levers 23 and 24, an electromagnet $Mg_1$ for controlling actuation of lever 24 for releasing rear shutter curtain 19, a start switch $S_1$ arranged to be opened when front curtain 18 is released from lever 23, an energy supply control switch $S_2$ arranged to be closed when the shutter mechanism is cocked to engage the rear curtain 19 with latching lever 24. The resetting of front and rear curtains 18 and 19 to their cocked positions is effected through a mechanical linkage between couplers 150 and 49 provided in the camera A and drive unit C respectively after they have been moved in the direction indicated by arrow F. The coupler 150 also serves as a part of a film winding mechanism. A shutter release button 25 is associated with switches $S_3$ and $S_4$ arranged to be closed when shutter button 25 is depressed to the first and second strokes respectively, whereby an exposure value computing circuit 28 and display circuit 27 are rendered operative by the closure of switch $S_3$, and an exposure determining circuit 37 and a shutter control circuit 39 are rendered operative by the closure of switch $S_4$.

An automatic exposure control system of the camera A includes, in addition to the display circuit 27 and the exposure value computing circuit 28, a shutter release circuit 29, these parts being connected to a common lead 26 of an electrical energy supply source or battery $E_1$. The exposure value computing circuit 28 is receptive of the output signals 124 and 126 of the photosensitive element 16 and a film speed information source or film speed setting means 32 respectively, and also selectively receptive of the output signals 127 and 125 of a diaphragm value information source 30 and a shutter speed information source 31 respectively through a first two-way exposure range selection switching circuit 33. A second two-way exposure range selection switching circuit 33' is provided to select the operating range of the camera A in automatic response to either of signals 122 and 123 to which first switching circuit 33 is also responsive, as these signals 122 and 123 appear independently of each other at respective times when the motor drive unit C is switched from SINGLE FRAME position to RUN position by a mode selection switching circuit 46 and when the unit C is attached to the camera A. When the shutter preselection automatic exposure range is selected, the proper diaphragm aperture value is automatically formed at 11 by the exposure determining circuit 37 in conformance with the exposure value derived from the computing circuit 28, as the output of circuit 37 is transferred by second switching circuit 33' through its output terminal T to the Diaphragm 11, while the output of shutter speed information source 31, namely, a preselected shutter speed-dependent signal 125 is applied to a shutter control circuit 39 associated with the electromagnet $Mg_1$ and the start switch $S_1$. On the other hand, when the diaphragm preselection automatic exposure range is selected, the period of actuation of the shutter control circuit 39 is controlled in accordance with the exposure value derived from the circuit 28 through the exposure determining circuit 37 as the output of circuit 37 is transferred by the second switching circuit 33 through its output terminal F to the shutter control circuit 39, while a preselected diaphragm value is manually introduced to the diaphragm 11 by a diaphragm control ring not shown constituting part of the source 30. The aforesaid display circuit 27 has two input terminals connected to the respective output terminals of the exposure value computing circuit 28 and a warning circuit 34 to display the exposure value in relation to the shutter speed scale or diaphragm value scale and also to serve as a battery testing circuit, misset checking circuit and the like through a display device including a light-emitting diode 17 positioned in the viewfinder.

A block 35 includes, in addition to the aforesaid circuits 37 and 39, two self-retaining circuits 36 and 36' for retaining a once established energy supply to circuit 37, a release mechanism actuating circuit 38 and shutter control circuit 39 until switch $S_2$ is opened regardless of the fact that the pressure of the finger of the operator is removed from the shutter button 25. As a result, the circuits 37, 38 and 39 are supplied with energy from battery $E_1$ through the common switch $S_2$ only during the time when the rear shutter curtain 19 remains in the cocked position, while the block 26 remains energized at any phase of operation of the camera A after the depression of shutter button 25. Circuit 38 has an output terminal connected to the solenoid of a second electromagnet $Mg_2$ for controlling actuation of diaphragm 11, mirror 12 and shutter front curtain 18. The housing of camera A is provided with four interconnection terminals $t_1$ to $t_4$ arranged to be connectable with respective interconnection terminals $t_1'$ to $t_4'$ of unit C.

A frame frequency selector device is indicated at B as including a pulse generator 40 having a pulse frequency corresponding to the preselected frame frequency, and is shown as constructed in the form of a separate unit from camera A and unit C. The housing of device B is provided with four interconnection terminals $t_5'$ to $t_8'$ arranged to be connectable with the respective terminals $t_5$ to $t_8$ of the drive unit C.

The motor drive unit C includes a one-shot control circuit 41, a release actuating circuit 42, an energy supply control circuit 43 for an electric motor M, a braking circuit connected across motor M winding, a delay circuit 45 for automatically stopping motor M from rotation when the film winding operation caused by motor M is not completed in a predetermined time interval, a mode selection switching circuit 46 for selecting the operating mode of motor M to effect either of continuous exposure and single frame exposure at A, and a release button 47 provided on the housing of unit C. A release switch $S_5$ is positioned adjacent the release button 47 to be closed when button 47 is depressed. $E_2$ is a battery providing an electrical energy through a power switch $S_6$. Additional two switches $S_7$ and $S_8$ are provided to cut off the one-shot control circuit 41 and the rame frequency selecting device B from the drive control system respectively.

The operation of the motor driven camera of FIG. 3 with the switching system of the invention is as follows: The camera A and unit C are assumed to be in the cocked position. At first, when the release button 47 of unit C is depressed to close release switch $S_5$, a start signal 120 is applied from switch $S_5$ to release circuit 42 causing production of a shutter release actuating signal 121 which is then applied to each of three circuits 29, 41 and 40 through terminals $t_2-t_2'$ connection for the shutter release circuit 29 and through terminals $t_5-t_5'$ connection for the frame frequency control circuit 40. So long as switch $S_8$ is closed to supply electrical energy from battery $E_2$ through terminals $t_6-t_6'$ connection to the circuit 40, the counting operation of circuit 40 is initiated by signal 121. It is to be noted that, at this time, the block 26 is already rendered operative.

In order to make a series of successive frame exposures, the switching system of the invention is operated in a manner described below. When the mode selection switching circuit 46 is set to produce a signal 122 representing the RUN position, both of the first and second exposure range selection switching circuit 33 and 33' are actuated by signal 122 entering through terminals $t_3-t_3'$ connection to select the shutter preselection automatic exposure range. This actuation may be otherwise effected by signal 123 which is to be produced when drive unit C is attached to camera A. At this stage of FIG. 3 system, the exposure value computing circuit 28 is rendered receptive of the output signals 124, 125 and 126 from photosensitive element 16, shutter speed information source 31 through the terminal T of first switching circuit 33, and film speed information source 32 respectively. Responsive to the output of exposure value computing circuit 28, display circuit 27 displays the exposure value, in this instance, an effective diaphragm aperture value by means of light-emitting diode 17 in the viewfinder. As the self-retaining circuits 36 and 36′ are already actuated by signal 121 through shutter release detecting circuit 29 to retain the energy supply to the block 35 until each frame exposure is terminated regardless of the fact that the pressure of the finger of the operator is removed from release button 47 to open switch $S_5$, the release mechanism-actuating circuit 38 is actuated in synchronism with the termination of metering followed by computing operation of circuit 28 to energize second electromagnet $Mg_2$, thereby the diaphragm motion scanning operation is initiated to introduce the effective diaphragm aperture value into the diaphragm 11 as the output of exposure value computing circuit 28 after translated to the value of automatic diaphragm is transferred to diaphragm 11 by the second switching circuit 33 through terminal T thereof. At the same time, upward movement of mirror 12 is initiated, and then followed by disengagement of latching lever 23 from front shutter curtain 18 which causes running-down movement of front shutter curtain 18 under the action of driving spring 21 in the opposite direction to that indicated by arrow F, thereby a first frame exposure is initiated. Such movement of curtain 18 causes switch $S_1$ to be opened to produce an actuating signal 130 for shutter control circuit 39. At the termination of duration of the preselected shutter time, first electromagnet $Mg_1$ is energized by circuit 39 to disengage latching lever 24 from rear curtain 19, causing the rear curtain 19 to run down under the action of driving spring 22 in the direction opposite to that indicated by arrow F, and also causing switch $S_2$ to be opened to produce a signal 136 which is applied as a signal 131 to the first input terminal of an AND gate 47 of drive unit C through terminals $t_1$–$t_1'$ connection. The opening of switch $S_2$ also causes deactuation of circuit 38.

To the second input terminal of AND gate 47 is applied a signal 134 which appears at the output terminal of an OR gate 48 when the counting operation of one-shot control circuit 41 is terminated to produce a signal 132 which is applied to a first input terminal of OR gate 48, or when switch $S_7$ is opened to produce a signal 133 which is applied to a second input terminal of OR gate 48. AND gate 47 is, therefore, arranged to produce an output signal 135 at the time of simultaneous occurrence of signals 131 and 134, in this instance, at the time when the one-shot control circuit 41 has counted the predetermined time interval $T_R$ of FIG. 2A after the first frame exposure is completed. Signal 135 is applied to both of energy supply control circuit 43 and delay circuit 45, thereby motor M is driven for rotation to effect the cocking of shutter curtains 18 and 19 along with the winding up of the associated film through the length of one frame as the motion of motor M is transmitted through couplers 49 and 50 linkage to the cocking and winding mechanism of camera A. Now assuming that the actual film winding operation is not completed within a time interval predetermined by delay circuit 45, deactuation of motor M is controlled by the output of delay circuit 45. On this account, the delay time interval must be adjusted to a level slightly longer than the time interval necessary to complete the winding process, for example, equal to about 500 milliseconds by assuming that the usual winding process takes a time interval of 150 to 300 milliseconds depending upon the voltage of battery $E_2$ of unit C. When the winding and cocking operation has been completed in a time interval $T_W$ of FIG. 2A shorter than the delay time interval, switch $S_2$ is closed to produce a signal 136 which is applied both to energy supply control circuit 43 and to the first input terminal of an AND gate 51. At this time, signal 136 serves as a deactuating signal for motor M so that motor M is rapidly stopped from rotation under action of braking circuit 44.

When the aforesaid frame frequency control circuit 40 has counted a preselected frame frequency, a signal 137 is produced which is applied through terminals $t_7$–$t_7'$ connection to a first input terminal of an OR gate 52 of unit C. OR gate 52 may be otherwise operated with either of signals 130 and 139 which are to be respectively produced when switch $S_8$ is opened to cut off the circuit 40 from the system of unit C while permitting the attachment of unit B to unit C, and when an external trigger signal such as from an ocilloscope or motion of the subject being photographed is applied to the trigger terminal 53. The output signal 140 from OR gate 52 is applied to the second input terminal of AND gate 51. As signal 136 is applied to the first input terminal of AND gate 51, release circuit 42 is actuated by signal 141 of AND gate 51 to produce signal 121 again, thereby a second shutter release is initiated. Such procedure repeats itself until the series of successive frame exposures.

For SINGLE FRAME operation mode selection switching circuit 46 will be set to SINGLE FRAME position so that camera A is switched to the diaphragm preselection automatic exposure range. The shutter speed information source 31 is cut off the exposure value computing circuit 28 by the first switching circuit 33, and instead the diaphragm value information source 30 is connected thereto. When the diaphragm control ring is operated to select a desired diaphragm value, a signal 125 is applied to circuit 28 which produces an output respresenting an effective exposure time. This output after translated to an exposure time-dependent signal 129 is transferred by second switching circuit 33′ through terminal F thereof to the shutter control circuit 39. It is to be noted that, for SINGLE FRAME operation, camera A will be not always switched to the diaphragm preselection exposure range but may be used in the shutter preselection exposure range.

Figure 4:
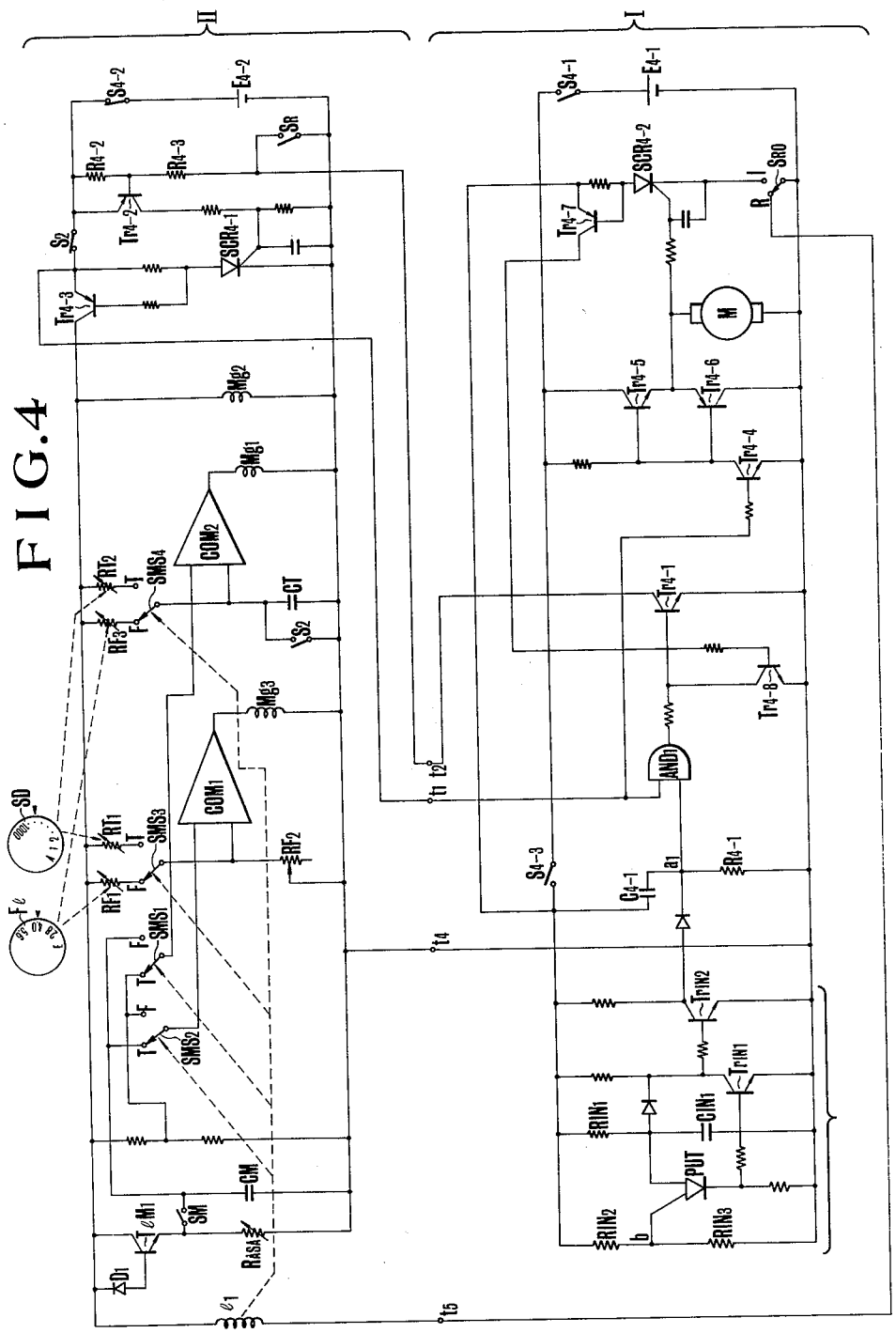
FIG. 4 is a schematic circuit diagram of one embodiment of a switching system according to the invention in which the switching to the shutter preselection automatic exposure range is effected in automatic response to the setting of the drive unit from SINGLE FRAME position to RUN position.

FIG. 4 shows one embodiment of an exposure range selection switching circuit according to the invention as established in the combination between an automatic exposure control circuit designated by II and a motor drive control circuit designated by I.

Circuit I includes a battery $E_{4-1}$, a power switch $S_{4-1}$ connected in the positive bus of battery $E_{4-1}$, and a release switch $S_{4-3}$ connected in the positive bus between an energy supply control circuit for motor M and a frame frequency control circuit INT. When release switch $S_{4-3}$ is closed, a release signal of high level is instantaneously produced at a point ($a_1$) on connection between a condenser $C_{4-1}$ and a resistor $R_{4-1}$, the series-connected condenser $C_{4-1}$ and resistor $R_{4-1}$ being connected between the positive and negative buses. The point ($a_1$) is connected to an input terminal of an AND gate $AND_1$, of which the other input terminal is connected to a switch $S_2$ of camera through an interconnection terminal $t_1$. The output terminal of AND gate $AND_1$ is connected through a resistor to the base electrode of a transistor $Tr_{4-1}$ controlling actuation of an energy supply control circuit of camera. Transistor $Tr_{4-1}$ has a collector electrode connected through an interconnection terminal $t_2$ a voltage divider of resistors $R_{4-2}$ and $R_{4-3}$ of camera. Transistors $Tr_{4-4}$ and $Tr_{4-5}$ constitute an energy supply control circuit for motor M. Connected between the terminals of a winding of motor M is a braking transistor $Tr_{4-6}$. A mode selection switch $S_{RO}$ is provided to select the mode of operation of motor M and is switchable between RUN position designated R and SINGLE FRAME position designated by numeral 1. When switch $S_{RO}$ is set in SINGLE FRAME position, a drive is established by a circuit comprising a thyristor $SCR_{4-2}$ and transistors $Tr_{4-7}$ and $Tr_{4-8}$, while the base-emitter of transistor $Tr_{4-1}$ is short-circuited by transistor $Tr_{4-8}$.

Frame frequency control circuit INT includes a voltage divider of resistors $R_{IN2}$ and $R_{IN3}$, a timing circuit of a resistor $R_{I_1}$ and condenser $C_{IN_1}$, and a programmable unijunction transistor PUT connected between the voltage divider and a timing circuit, these parts consituting a timer circuit of known construction. A pulse train of predetermined repitition rate is applied from PUT through transistors $Tr_{IN_1}$ and $Tr_{IN_2}$ to AND gate $AND_1$. The repitition rate is dependent upon resistor $R_{IN_1}$ and condenser $C_{IN_1}$ and is adjusted by taking into account the sum of a time interval necessary to complete the exposure control operation such as the diaphragm control and shutter control operation and a time interval necessary to complete the winding operation including the shutter-cocking operation.

The exposure control circuit II includes a battery $E_{4-2'}$ a power switch $S_{4-2'}$ a release switch $S_R$ arranged to be closed when a not shown shutter release button is depressed, a switch $S_2$ arranged to be closed so long as the rear shutter curtain remains in the cocked position, resistors $R_{4-2}$ and $R_{4-3}$, said resistor $R_{4-3}$ being connected at one end to the collector electrode of transistor $Tr_{4-3}$ of motor drive circuit I through terminal $t_{2'}$ a thyristor $SCR_{4-1'}$ and an energy supply transistor $Tr_{4-3}$ constituting an energy supply circuit together with transistor $Tr_{4-2}$ and thyristor $SCR_{4-1}$. $Mg_2$ is an electromagnet controlling actuation of a drive member for a diaphragm mechanism of known construction. The exposure control circuit further includes a sensor circuit comprising a photosensitive element $D_1$ such as photocell, a transistor $TIM_1$ having a base electrode connected to the photosensitive element $D_1$ and a variable resistor $R_{ASA}$ cooperative with a not shown film speed dial to set therein film speed information. The output terminal of sensor circuit, namely, the point on connection between the emitter electrode of transistor $TIM_1$ and variable resistor $R_{ASA}$ is connected through a memory switch SM to a storage capacitor CM. An exposure range selection switch assembly is provided to switch the exposure control circuit II from the diaphragm preselection automatic exposure range designated F to the shutter preselection automatic exposure range designated T in automatic response to the switching of switch $S_{RO}$ from I position to R position, or vice versa, and comprises four switch elements $SMS_1$ to $SMS_4$ all of which are arranged to cooperate with a common relay $L_1$ with a coil connected to switch $S_{RO}$ through interconnection $t_1$. A diaphragm control circuit comprises a comparator $COM_1$ having a first input terminal selectively receptive of the light value stored on capacitor CM and the reference voltage of a voltage divider through second switch element $SMS_2$ and having a second input terminal selectively receptive of the outputs of diaphragm value and shutter speed setting variable resistors $RF_1$ and $RT_1$ cooperative with a diaphragm control ring F1 and shutter speed dial SD respectively through third switch element $SMS_3$. The second input terminal of comparator $COM_1$ is also connected to a variable resistor $RF_2$ having a function of scanning motions of the diaphragm mechanism. The output terminal of comparator $COM_1$ is connected to the solenoid of electromagnet $Mg_3$ controlling actuation of a front curtain latching member. A shutter control circuit comprises a comparator $COM_2$ having a first input terminal selectively receptive of the outputs of the storage capacitor CM and the voltage divider through a first switch element $SMS_1$ and having a second input terminal selectively receptive of the outputs of diaphragm value and shutter speed setting variable resistors $RF_3$ and $RT_2$ cooperative with ring F1 and dial SD respectively through fourth switch element $SMS_4$. The second input terminal of comparator $COM_2$ is connected to a timing capacitor CT across which a start switch $S_1$ is connected. The output terminal of comparator $COM_2$ is connected to the solenoid of electro-magnet $Mg_1$ controlling actuation of rear curtain latching member.

Figure 5:
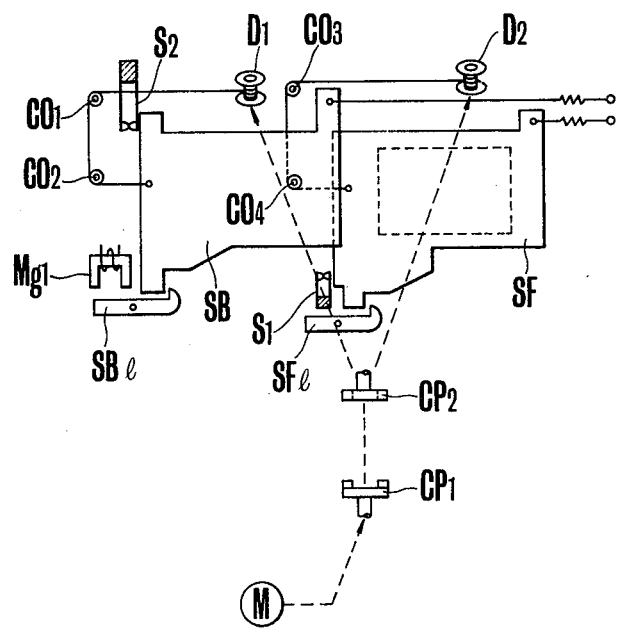
FIG. 5 is a fragmentary schematic view illustrating a typical example of mechanical linkage between the camera shutter cocking mechanism and the output member of the drive unit of FIG. 4.

FIG. 5 schematically shows an example of the mechanical linkage between a motor drive unit I and a camera II. The motion of motor of FIG. 4 is transmitted to a coupler $CP_1$ provided in the unit II' then therefrom transmitted to a coupler $CP_2$ provided on the camera I as the couplers $CP_1$ and $CP_2$ are engaged with each other when the unit II is attached to the camera I, and therefrom transmitted to both of winding-up drums $D_1$ and $D_2$ on which one ends of respective tapes are wound after the tapes have passed around idlers $CO_1$ to $CO_4$, the opposite ends of which tapes are connected to front and rear shutter curtains SF and SB. Two levers SF1 and SB1 are provided to latch the curtains SF and SB in the cocked positions and arranged to cooperate with switch $S_1$ and electromagnet $Mg_1$ respectively. A switch $S_2$ is positioned adjacent the rear curtain in the cocked position to be opened when the rear curtain SB1 runs down to cover an exposure aperture indicated by dash lines.

The operation of the circuit of FIG. 4 will next be explained. Now assuming that the exposed film frame has been wound up and the shutter has been reset to the cocked position, when not shown control knobs provided on the unit I and camera II are manually operated from the outside thereof to close respective power switches $S_{4-1}$ and $S_{4-2}$ and then a not shown release button of motor drive unit I is operated to close switch $S_{4-3}$, a current is allowed to flow to condenser $C_{4-1}$ with the resultant high potential appearing at point (a). At this time, as the shutter remains in the initial or cocked position, switch $S_2$ remains closed so that the potential of interconnection terminal $t_1$ is also high, and therefore the output of $AND_1$ instantaneously becomes high so that transistor $Tr_{4-1}$ is turned on. As a current flows through resistors $TR_{4-2}$ and $R_{4-3}$ to transistor $Tr_{4-1}$, transistor $Tr_{4-2}$ is turned on to apply a voltage to the gate of thyristor $SCR_{4-1}$ so that $SCR_{4-1}$ is turned on. This in turn causes transistor $Tr_{4-3}$ to be turned on to initiate exposure control operation. On the other hand, the closure of switch $S_{4-3}$ also causes actuation of frame frequency control circuit INT so that pulses are produced therefrom at a frequency determined by resistor $R_{IN_1}$ and condenser $C_{IN_1}$. The time interval between the successive two pulses is longer than the sum of a time interval necessary for the shutter control and diaphragm control and a time interval necessary for film winding operation so that the level of potential at point ($a_1$) is maintained zero during the time after the closure of switch $S_{4-3}$. When transistor $Tr_{4-3}$ is turned on, electro-magnet $Mg_2$ is actuated causing upward pivotal movement of a reflex mirror and control operation for adjustment of the diaphragm. Now assuming that a not shown selector is already set to operate the diaphragm preselection automatic exposure range with switch elements $SMS_1$ to $SMS_4$ being in their F positions, the first input terminal of comparator $COM_1$ is rendered receptive of a predetermined voltage through second switch element $SMS_2$, while the second input terminal is rendered receptive of ever-varying voltages at a point on connection between variable resistor $RF_1$ and variable reistor $RF_2$ of which the resistance value is being varied as the diaphragm motion scanning mechanism is actuated by electromagnet $Mg_2$. When a predetermined relationship between resistance values $RF_1$ and $FR_2$ as detected by comparator $COM_1$ has been established, electromagnet $Mg_1$ is actuated to arrest the scanning mechanism and initiate to disengage the lever SF1 of FIG. 5 from the front shutter curtain SF, thereby an exposure is initiated. At this time, switch $S_1$ is opened to charge condenser CR through resistor $RF_3$ and switch $SMS_4$. As the resistance value of resistor $RF_3$ is adjusted by diaphragm control ring F1 likewise in the case of $RF_1$, and the first input terminal of comparator $COM_2$ is rendered receptive of the output of sensor circuit through switch $SMS_1$, comparator $COM_2$ produces an output in a time interval dependent upon the object brightness level, the sensitivity of the used film and the preselected diaphragm value. This output is applied to the solenoid of electromagnet $Mg_1$ so that lever SB1 of FIG. 5 is disengaged from rear shutter curtain to terminate the exposure.

Alternately assuming that switch $S_{RO}$ was set in RUN position by not shown control means accessible from the outside of drive unit 1, when transistor $Tr_{4-3}$ in circuit II is turned on, relay coil $L_1$ is energized to move the exposure range selection switch assembly SMS to T position, thereby the shutter preselection exposure range is rendered operative. Comparator $COM_1$ is rendered operative with sensor circuit at the first input terminal thereof through storage condenser CM and switch element $SMS_2$ and with the shutter speed setting variable resistor $RT_1$ and diaphragm motion scanning resistor $RF_2$ so that the value of diaphragm aperture is automatically formed depending upon the object brightness level, film speed and preselected shutter speed. Comparator $COM_2$ is rendered operative with shutter speed setting variable resistor $RT_2$ so that at the termination of duration of the preselected exposure time, electromagnet $Mg_1$ is energized to actuate rear curtain latching lever. As the rear curtain runs down, switch $S_2$ is opened to turn off transistor $Tr_{4-4'}$ and then transistor $Tr_{4-5}$ is turned on to energize motor M. When the film winding and shutter cocking operation has been completed, switch $S_2$ is closed again to apply a voltage of high level to the base of transistor $Tr_{4-4}$, thereby transistor $Tr_{4-5}$ is turned off to terminate the energization of motor M and simultaneously braking transistor $Tr_{4-6}$ is turned on which has been supplied at its emitter with the induced voltage of motor M and at its base with a low level voltage because of the non-conduction of transistor $Tr_{4-4}$. Thus, first one cycle of exposure operation has been completed. Next when a second pulse is produced from INT, a second exposure operation is initiated. The operation of INT is as follows. As shown above, when switch $S_{4-3}$ is turned on, the charging of timing condenser $C_{IN_1}$ through resistor $R_{IN_1}$ is initiated and continues for a time interval depending upon the time constant predetermined so that the time interval is longer than that necessary to complete the aforesaid one cycle of exposure operation. At the termination of duration of this time interval, the voltage of condenser $C_{IN_1}$ reaches a level equal to that of point ($h$) so that programmable uni-junction transistor is instantaneously turned on, then transistor $Tr_{IN_1}$ is instantaneously turned on, and then transistor $Tr_{IN_2}$ is instantaneously turned off to apply a pulse of short duration to AND gate $AND_1$ at one input terminal, the other input terminal of which remains supplied with a voltage of high level through switch $S_2$ and terminal $T_1$, thereby transistor $Tr_{4-1}$ is turned on by the pulse from AND gate $AND_1$. Subsequent operation proceeds in a manner similar to that shown above. Thus, each time frame frequency control pulse generator INT produces a pulse, one cycle of exposure operation is initiated in the shutter preselection automatic exposure range.

For SINGLE FRAME operation, switch $S_{RO}$ is set to "1" position so that relay coil $L_1$ can not be energized when release switch $S_{4-3}$ is closed to turn on transistors $Tr_{4-1}$, $Tr_{4-2}$ and $Tr_{4-3}$, permitting for the operator to manually set the exposure range selection switch assembly SMS to either of the shutter preselection and the diaphragm preselection automatic exposure ranges by means of a not shown control knob operable from the outside of the camera housing. At the termination of a single frame exposure, switch $S_2$ is opened so that transistor $Tr_{4-4}$ is turned off and transistor $Tr_{4-5}$ is turned on to energize motor M. At this time, unlike the aforedescribed manner, $SCR_{4-2}$ is turned on by the induced voltage of motor M so that transistor $Tr_{4-7}$ is turned on to apply a voltage of high level to the base of transistor $Tr_{4-8}$. For this reason, the base potential of transistor $Tr_{4-1}$ is maintained at a low level despite of the fact that switch $S_2$ is closed as a result of the completion of shutter cocking and film winding operation by energized motor M to thereby inhibit application of a second pulse from frame frequency control pulse generator INT through AND gate $AND_1$ to the base of transistor $Tr_{4-1}$. Thus, the SINGLE FRAME operation can be secured.

Figure 6:
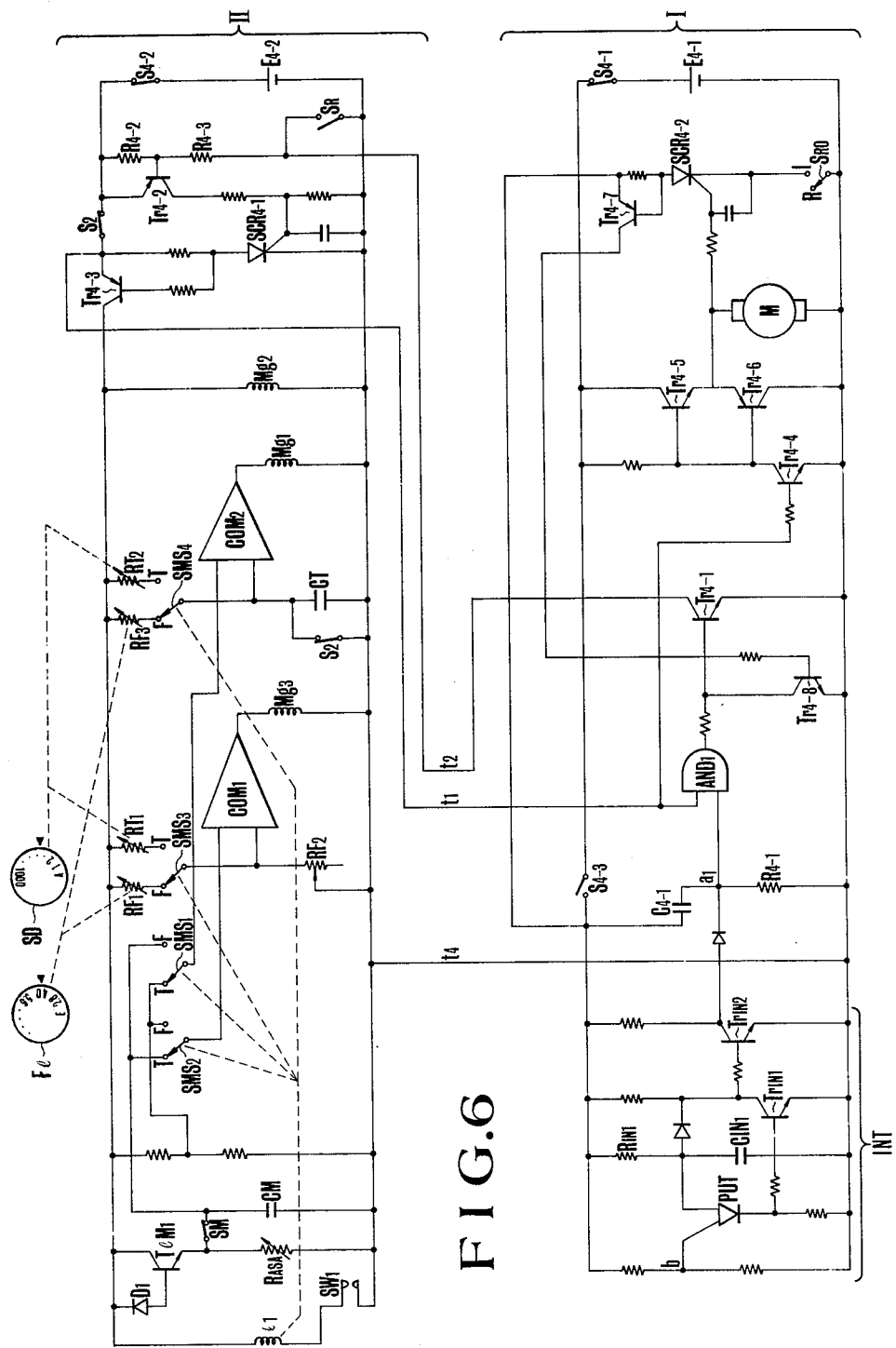
FIG. 6 is a schematic circuit diagram of another embodiment of a switching system according to the invention in which the switching to the shutter preselection automatic exposure range is effected in automatic response to the attachment of a motor drive unit to the camera body.
Figure 7:
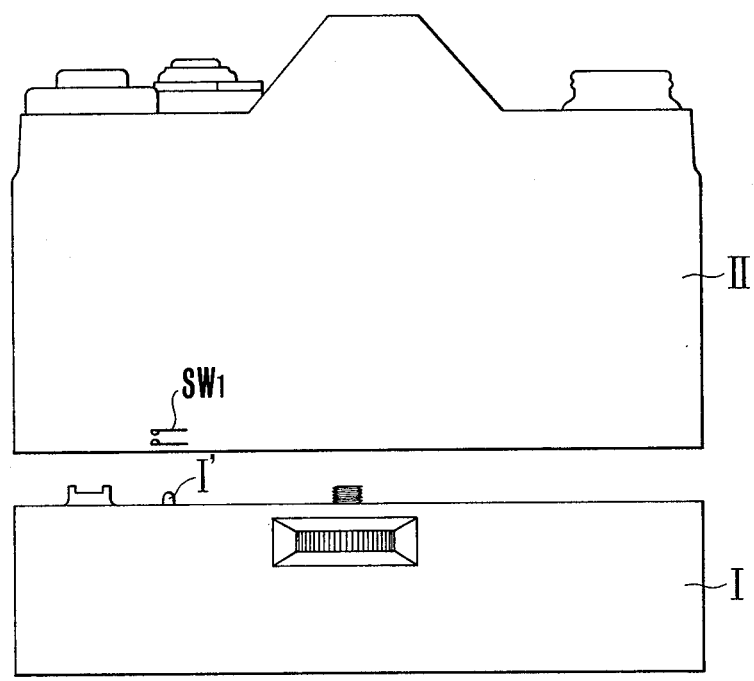
FIG. 7 is an elevational view of a camera body and a motor drive unit which are about to be assembled with each other to effect the function of FIG. 6.

FIG. 6 shows another embodiment of the exposure range selection switching system according to the invention wherein the relay coil $L_1$ of FIG. 4 embodiment is arranged in a different manner therefrom so that an energy supply circuit for relay coil $L_1$ is always established when a motor drive unit I is attached to a camera II independently of whether switch $S_{RO}$ is in "1" position or "R" position as a switch $SW_1$ connected in the energy supply circuit is closed by means such as a projection I' provided on the housing of unit I as shown in FIG. 7. With this arrangement, it is possible to switch the camera II from the diaphragm preselection to the shutter preselection automatic exposure range in automatic response to the attachment of the motor drive unit II to the camera II.

Figure 8:
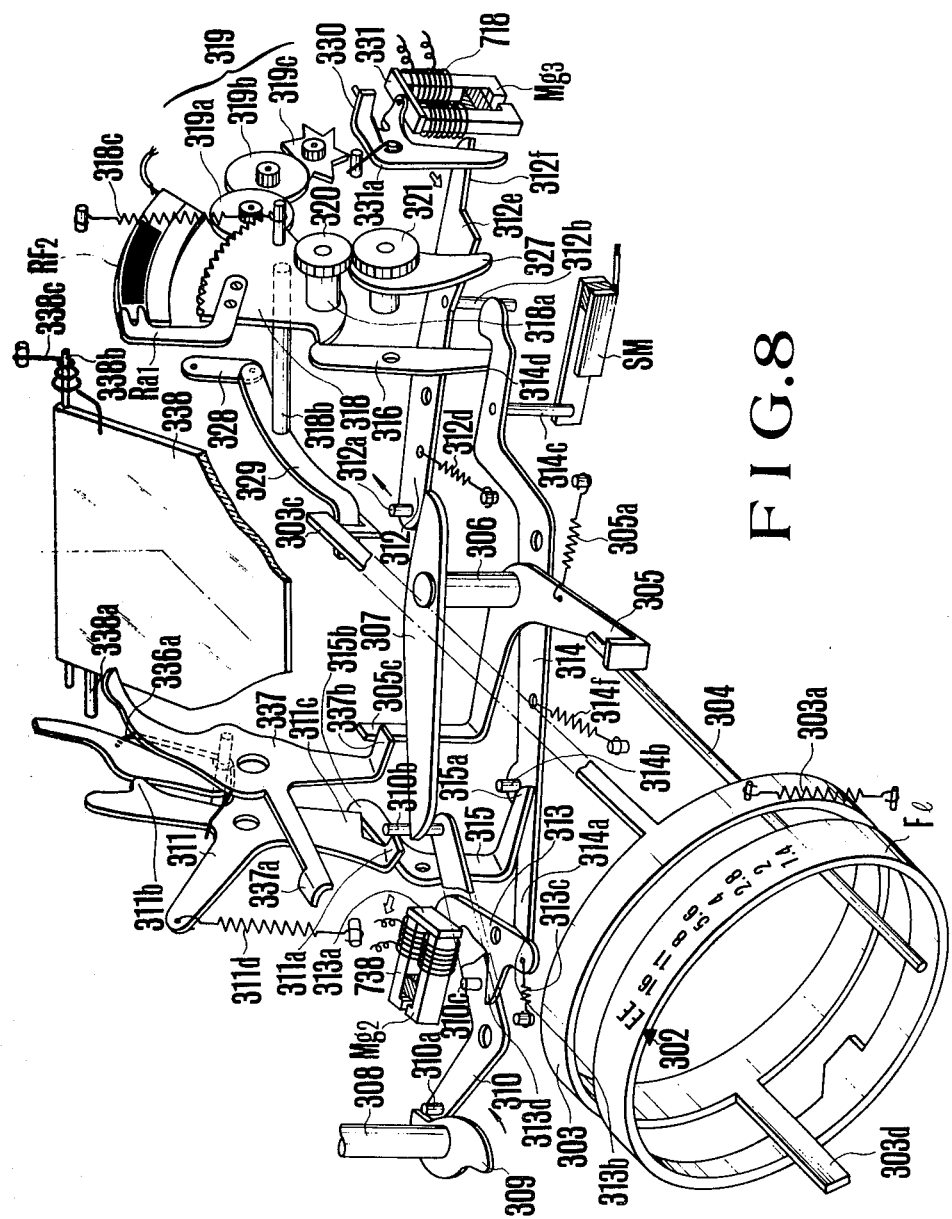
FIG. 8 is a perspective view of part of the camera mechanisms including a diaphragm motion scanning mechanism which is associated with the diaphragm control circuit of FIG. 4 or 6.

FIG. 8 shows a typical example of a diaphragm motion scanning mechanism adapted for use with the automatic exposure control circuit of FIG. 4 and FIG. 6 and associated with other mechanisms of a single lens reflex camera including a lens aperture mechanism, a mirror and diaphragm drive mechanism, and a release and cocking mechanism, each of which will be described below.

The lens aperture mechanism provided in a not shown lens barrel comprises a manually operable diaphragm preselecting ring $F_1$ corresponding to that of FIGS. 4 and 6 and having cut thereon a symbol EE indicative of the shutter preselection automatic exposure range and a diaphragm scale with the graduations each of which can be brought into registry with a stationary index 302, and an automatically rotatable diaphragm presetting ring 303 which is biased by a spring 303a in a clockwise direction. The diaphragm presetting ring 303 is provided with first and second arms 303c and 303d which extend parallel to the optical axis of the objective lens rearwardly and forwardly respectively. The second arm 303d is operatively connected at its end with a not shown bellcrank member through a not shown cam ring so that the range of movement of a not shown diaphragm drive ring member is defined to adjust the size of diaphragm aperture when the diaphragm blade assembly is driven for movement from the fully open position. The aforedescribed drive ring member has a pin 304 fixedly mounted thereon and rearwardly extending parallel to the optical axis of the objective lens into the path of movement of an automatic two-armed drive lever 305 of the mirror and diaphragm drive mechanism.

The mirror and diaphragm drive mechanism comprises the drive lever 305 pivoted at a shaft 306 and biased by a return spring 305a in a counter-clockwise direction which tends to urge an upwardly rectangularly bent portion 305c for normally abutting engagement with a rectangularly bent portion 337b of a mirror control lever 337 which is operable from the outside of the camera housing through an intermediary not shown which acts on the bent portion 337a, a drive lever 311 pivotal about the common shaft of control lever 337 and pretensioned by a spring 311d which urges the lever 311 for counter-clockwise movement, and a mirror return control lever 336 which is pivoted at a pin mounted on mirror control lever 337 in eccentrically parallel relation to the common shaft thereof and which is biased by a spring 336a in a counter-clockwise direction to urge the lever 336 for engagement at an extension thereof with a pawl 311b of lever 311. So long as the lever 336 is engaged with the drive lever 311, the driving force of lever 311 imparted by spring 311d is transmitted to the mirror control lever 337 and therefrom further transmitted to the diaphragm drive lever 305 through the extension 337b-and-extension 305c engagement. The mirror 338 is movable between viewing and non-viewing positions by the control lever 337 and of which the upwardly extending arm movably bears at the end portion thereof a stud 338a extending from the side of the support member of mirror 338.

The release and cocking mechanism includes an electromagnet $Mg_2$ of FIGS. 4 and 6, and a first latching lever 313 carrying an armature 313a arranged to cooperate with electromagnet $Mg_2$ and which is biased by a spring 313c in a clockwise direction so that when the solenoid 738 of electromagnet $Mg_2$ is deenergized, the first latching lever 313 is turned clockwise to disengage a lever end 313b from the tapered end 314a of a release lever 314 which is biased by a spring 314f in a counter-clockwise direction. The release lever 314 is arranged upon counter-clockwise movement to actuate second and third latching levers 315 and 316 for the mirror drive and the diaphragm motion scanning mechanisms respectively. The second latching lever 315 has a tapered portion 315a formed on the end of rectangularly bent portion of one arm thereof and arranged to maintain normal abutment with a pin 314b upwardly extending from lever 314, and has a pawl 315b formed on the end portion of the other arm thereof and arranged to be brought into engagement with a projection 311c of mirror drive lever 311 when the cocking lever not shown is operated. The third latching lever 316 is arranged for abutting engagement at its tail with the one arm 314d of release lever 314 opposite to that cooperative with the second latching lever 315. The release lever 314 is further provided with a perpendicularly downwardly extending pin 314c arranged to cooperate with a normally closed memory switch SM of FIG. 4 or FIG. 6. The release and cocking mechanism further includes a shaft 308 having the film winding lever mounted at the top end thereof and having a cam disk 309 coaxially fixedly mounted on the bottom end thereof, and a bellcrank lever 310 having a first pin 310a fixedly mounted at one end thereof and arranged to be engageable with one end of an intermediate lever 307 pivoted at the shaft 306, the other end of which is engaged with a pin 312a mounted on the escapement 312 so that when lever 307 is turned counter-clockwise by bellcrank lever 310, the escapement 312 is turned clockwise against the force of spring 312d until a sector 318 constituting part of the scanning mechanism is set in the cocked position by the third latching lever 316 through a lever arm 327-and-lever end 312e engagement, and an arresting lever 330 is disengaged from a star wheel 319c against the force of spring 331a. In order to transmit the cocking movement from escapement 312 to the release lever 314, there is provided a pin 312b perpendicularly downwardly extending from escapement 312 and arranged to be engageable with lever end 314e. In order to bring the first latching lever pawl 313b into engagement with the cocked release lever 314 against the force of spring 313c, there is provided a pin 310c fixedly mounted on bellcrank lever 310 arranged to cooperate with one arm 313e of first latching lever 313.

The diaphragm motion scanning mechanism comprises a gear sector 318 which is fixedly mounted on a rotatable shaft 318a and which is latched in the cocked position by the third latching lever 316, a pinion 320 fixedly mounted on the shaft 318a and meshing with a gear 321 fixedly mounted on a rotatable shaft 322, an arm 237 radially extending from the shaft 322 and engaging at the free end thereof with one arm 312e of escapement 312, a diaphragm presetting ring control lever 329 pivoted at a pin on the free end portion of arm 328, the opposite end of which is pivotally mounted on the camera housing, and connected at the center to a pin 318 extending from gear sector 318 in eccentrically parallel relation to the shaft 318a, the free end of lever 329 bearing the end of arm 303c of diaphragm presetting ring 303 against the load of spring 303a, a governor 319 including a gear 319a engaging with the gear segment of sector 318, a gear 319b engaging with gear 319a and a star wheel 319c, and the arresting lever 330 associated with an electromagnet $Mg_3$ having a permanent magnet core with solenoid 718 and biased by a spring 331a which tends to urge the lever 330 for counter-clockwise movement about a pivot pin thereof so that when zero magnetic flux is established in electromagnet $Mg_3$, the pawl of lever 330 is brought into arresting engagement with one of the teeth of star wheel 319c.

The operation of the mechanisms of FIG. 8 is not essential to the present invention, but the operation of the scanning mechanism will be outlined below. When the solenoid 738 of electromagnet Mg₂ is energized to cancel the magnetic flux of permanent magnet core thereof, the first latching lever 313 is turned clockwise under the action of spring 313c so that counter-clockwise movement of release lever 314 under the action of spring 314f causes closure of memory switch SM by pin 314c and also causes disengagement of third latching lever 316 from sector gear 318. As sector gear 318 is driven by spring 303a for clockwise movement along with the diaphragm presetting ring 303, the slider RA₁ of variable resistor RF₂ of FIGS. 4 and 6 scans the resistance material track thereof. When the ever-varying resistance values as detected by comparator COM₁ has reached a threshold level, the solenoid 718 of electromagnet Mg₃ is energized to cancel the magnetic flux of permanent magnet thereof, thereby the arresting lever 330 is turned counter-clockwise under the action of spring 331a to arrest star wheel 319c. As a result, the exposure value derived from the exposure control circuit II of FIGS. 4 and 6 is introduced into the lens aperture mechanism where it is to be translated to the proper diaphragm aperture value. The counter-clockwise movement of release lever 314 also causes disengagement of second latching lever 315 from the mirror and diaphragm drive lever 311, thereby the diaphragm blade assembly is set by pin 304 from the fully open position to a position dependent upon the position of the diaphragm presetting ring 303 already adjusted by the scanning mechanism, and then the mirror 338 is moved from its viewing position to the non-viewing position by control lever 337.

What is claimed is:

1. A motor driven photographic camera having an automatically operated exposure mode selection switching circuit comprising in combination:
   (A) a camera body having:
     (a) a light measuring circuit for producing an output corresponding to the level of brightness of a scene being photographed; and
     (b) an exposure control circuit receptive of the output of said light measuring circuit and selectively operating in either of a shutter preselection automatic exposure mode and a diaphragm preselection automatic exposure mode; and
   (B) a motor drive circuit regulating at least the film winding operation of said camera, said circuit having:
     (a) an electric motor for controlling at least the film winding operation;
     (b) a motor drive control circuit connected to said motor and having at least two selective functions of driving said motor for a number of cycles of operation at a predetermined frequency for each actuation of the trigger to result in the corresponding number of successive frame exposures and of driving said motor for only one cycle of operation for each actuation of the trigger to result in a single frame exposure;
     (c) motor function selecting means connected to said motor drive control circuit to select either of the continuous exposure function and the single exposure function; and
     (d) exposure mode changeover means connected in said exposure control circuit and responsive to the actuation of said function selecting means upon selection of the continuous exposure function to automatically switch said exposure control circuit to the shutter preselection automatic exposure mode.

2. A motor driven photographic camera having an automatically operated exposure mode selection switching circuit comprising in combination:
   (A) a camera body including:
     (a) a sensor circuit for producing an output corresponding to the level of brightness of a scene being photographed;
     (b) shutter speed setting means for producing an output corresponding to a preselected shutter speed value;
     (c) diaphragm value setting means for producing an output corresponding to a preselected diaphragm value;
     (d) a computing circuit responsive to the output of said sensor circuit and selectively responsive to either of the outputs of said shutter speed setting means and the diaphragm value setting means for deriving an exposure value representing an effective diaphragm aperture value or shutter speed;
     (e) changeover means for selectively applying either of the outputs from said shutter speed setting means and said diaphragm value setting means to said computing circuit;
     (f) exposure determining means controlling either of the shutter and the diaphragm of said camera based on the output of said computing circuit; and
     (g) film winding means for causing at least a film winding operation; and
   (B) a motor drive unit including:
     (a) an electric motor having an output shaft coupled to said film winding means to effect the film winding operation;
     (b) a first motor drive circuit arranged to be connectable to said motor upon connection to drive said motor for a number of cycles of operation at a predetermined frequency for each actuation of the trigger to result in the corresponding number of cycles of film winding operation;
     (c) a second motor drive circuit arranged to be connectable to said motor upon connection to drive said motor for only one cycle of operation for each actuation of the trigger to result in one cycle of film winding operation;
     (d) motor function selection switching means for selecting either of said first and second motor drive control circuit for connection with said motor; and
     (e) control means responsive to the operation of said function selection switching means and connected to said changeover means upon selection of said first motor drive circuit to apply the output of said shutter speed setting means to said computing circuit 3. A motor driven photographic camera according to claim 2, further including shutter means arranged to cooperate with said film winding means so that said shutter means is charged to the cocked position in one cycle of film winding operation.

4. A motor driven photographic camera according to claim 3, further including switching means arranged to cooperate with said shutter means upon termination of charging operation thereof for producing a first signal and upon termination of each frame exposure by said shutter means for producing a second signal, and wherein said first motor drive control circuit is arranged to cooperate with said switching means upon reception of said second signal for establishing a drive for said motor and upon reception of said first signal for stopping said motor from rotation.

5. A motor driven photographic camera according to claim 4, wherein said first motor drive control circuit includes a switching circuit arranged to cooperate with said switching means upon response to said second signal for forming an energy supply circuit for said motor and upon response to said first signal for blocking the energy suply circuit for said motor.

6. A motor driven photographic camera according to claim 5, wherein said second motor drive control circuit includes inhibiting means connected between said switching circuit and said switching means and arranged upon energization of said motor to be actuated to inhibit the application of said second signal to said switching circuit.

7. A motor driven photographic camera according to claim 2, wherein said control means includes relay means arranged to be actuated when said first motor drive circuit is selected by said motor function selection switching means.

8. A motor driven photographic camera according to claim 7, wherein said switching means is arranged to cooperate with said relay means.

9. A motor driven photographic camera having an automatically operated exposure mode selection switching circuit comprising in combination:
(a) a sensor circuit for producing an output corresponding to the level of brightness of a scene being photographed;
(b) shutter speed setting means for producing an output corresponding to a preselected shutter speed value;
(c) diaphragm value setting means for producing an output corresponding to a preselected diaphragm value;
(d) a computing circuit responsive to the output of said sensor circuit and selectively responsive to either of the outputs of said shutter speed setting means and said diaphragm value setting means for deriving an exposure value representing an effective diaphragm aperture value or shutter speed;
(e) shutter control means for controlling the period of actuation of the shutter of said camera in accordance with the output of said computing circuit or said shutter speed setting means;
(f) first changeover means for selectively applying either of the outputs from said shutter speed setting means and said diaphragm value setting means to said computing circuit;
(g) second changeover means for selectively applying either of the outputs from said shutter speed setting means and said computing means circuit to said shutter control means; and
(h) film winding means for causing at least a film winding operation;
(B) a motor drive unit including:
(a) an electric motor having an output shaft coupled to said film winding means;
(b) first detecting means responsive to the operation of said shutter control means upon termination of actuation thereof for producing an output;
(c) second detecting means responsive to the operation of said film winding means upon termination of each cycle of film winding operation for producing an output;
(d) switching means responsive to the output of said first detecting means for establishing a drive for said motor and responsive to the output of said second detecting means for stopping said motor from rotation;
(e) inhibiting means connected between said first detecting means and said switching means and arranged upon energization of said motor to inhibit the application of the output from said first detecting means to said switching means;
(f) selecting means for selectively actuating and deactuating said inhibiting means;
(g) control means cooperative with said selecting means upon deactuation of said inhibiting means by said selecting means to cause said first changeover means to apply the output from said diaphragm value setting means to said computing means and to cause said second changeover means to apply the output from said computing circuit to said shutter control means.

10. A motor driven photographic camera according to claim 9, wherein said shutter control means includes shutter means.

11. A motor driven photographic camera according to claim 10, wherein said first and said second detecting means are switching means arranged upon the charging of said shutter means to form a first signal and upon termination of each frame exposure by said shutter means to produce a second signal.

12. A motor driven photographic camera having an automatically operated exposure mode selection switching circuit comprising in combination:
(A) a camera body including:
(a) a light measuring circuit for producing an output corresponding to the level of brightness of a scene being photographed;
(b) an exposure control circuit receptive of the output of said light measuring circuit and selectively operating in either of a shutter preselection automatic exposure mode and a diaphragm preselection automatic exposure mode; and
(c) changeover means connected to said exposure control circuit for switching said exposure control circuit between the shutter preselection and the diaphragm preselection automatic exposure modes; and
(B) a motor drive unit regulating at least the film winding operation of said camera, said unit including:
(a) actuating means arranged to engage with said changeover means when said unit is attached to said camera body, whereby said exposure control circuit is automatically switched to the shutter preselection automatic exposure mode.

13. A motor driven photographic camera having automatically operated exposure mode selection switching circuit comprising in combination:
(A) a camera body including:
(a) a sensor circuit for producing an output corresponding to the level of brightness of a scene being photographed;
(b) shutter speed setting means for producing an output corresponding to a preselected shutter speed value;

(c) diaphragm value setting means for producing an output corresponding to a preselected diaphragm value;
(d) a computing circuit responsive to the output of said sensor circuit and selectively responsive to either of the outputs of said shutter speed setting means and said diaphragm value setting means for deriving an exposure value representing an effective diaphragm aperture value or shutter speed;
(e) changeover means for selectively applying either of the outputs from said shutter speed setting means and said diaphragm value setting means to said computing circuit;
(f) exposure determining means controlling the operation of either of the shutter and the diaphragm of said camera based on the output of said computing circuit; and
(g) control means connected to said changeover means for controlling application of the output from said shutter speed setting means to said computing means; and
(B) a motor drive unit regulating at least the film winding operation of said camera, said unit including;
(a) signal transmitting means for transmitting a signal to said control means when said unit is attached to said camera body, said control means being operated to apply said output from said shutter speed setting means to said computing circuit by means of said changeover means in response to said signal.

14. A motor driven photographic camera according to claim 13, wherein said control means includes switching means arranged to perform switching operation by said signal transmitting means when said unit is attached to said camera body.

15. A motor driven photographic camera according to claim 14, wherein said signal transmitting means is engaging means arranged to engage with said switching means, whereby said switching means is turned on when the engagement therebetween is effected.

16. A motor driven photographic camera according to claim 15, wherein said control means includes relay means arranged to be actuated when said switching means is turned on.

17. A motor driven photographic camera according to claim 16, wherein said changeover means is operatively connected to said relay means so that upon actuation of said means, the changeover operation is performed.

18. A camera usable with a motor drive unit comprising:
(a) light measuring circuit for producing an output corresponding to the intensity of light;
(b) a shutter time control circuit for selectively producing either a shutter time corresponding to the output of said light measuring circuit or a shutter time suitable for operation with a motor drive unit;
(c) changeover means connected to the shutter time control circuir for selecting one of the shutter times; and
(d) control means for producing a signal when said motor drive unit is attached to said camera, and said changeover means selecting said shutter time suitable for operation with a motor drive unit in response to said signal.

19. A camera usable with a motor drive unit comprising:
(a) a shutter time control circuit for controlling the shutter time, said circuit having a first shutter time control mode for controlling the shutter time at a shutter speed suitable to a photography using a motor drive unit;
(b) selecting means connected to the shutter time control circuit to select the first shutter control mode; and
(c) a control circuit coupled to the selecting means for causing the selecting means to select the first shutter time control mode when the motor drive unit is mounted on the camera.

20. A camera system having a photography mode changeover circuit for a motor drive unit which comprises:
(A) a camera body comprising:
(a) a shutter time control circuit for controlling the shutter time, said circuit having a first shutter time control mode for controlling the shutter time at a shutter speed suitable to operation using a motor drive unit; and
(B) a motor drive unit comprising:
(a) an electric motor for controlling at least the film winding operation;
(b) a motor drive control circuit connected to said motor and having at least two selective functions of driving said motor for a number of cycles of operation at a predetermined frequency for each actuation of the trigger to result in the corresponding number of successive frame exposures and of driving said motor for only one cycle of operation for each actuation of the trigger to result in a single frame exposure;
(c) motor function selecting means connected to said motor drive control circuit to select either of the continuous exposure function and the single exposure function, and
(d) control means connected to the shutter time control circuit, which selects the first shutter time control mode when a continuous exposure function is selected by the function selecting means.

* * * * *